(12) United States Patent
Iwaki et al.

(10) Patent No.: US 9,367,934 B2
(45) Date of Patent: Jun. 14, 2016

(54) IMAGE PROCESSING METHOD, IMAGE PROCESSING APPARATUS, AND IMAGE PROCESSING PROGRAM

(71) Applicant: FUJIFILM CORPORATION, Tokyo (JP)

(72) Inventors: Yasuharu Iwaki, Tokyo (JP); Mitsuhiro Uchida, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/556,417

(22) Filed: Dec. 1, 2014

(65) Prior Publication Data

US 2015/0086111 A1    Mar. 26, 2015

Related U.S. Application Data

(63) Continuation of application No. PCT/JP2013/064012, filed on May 21, 2013.

(30) Foreign Application Priority Data

May 30, 2012 (JP) .................................. 2012-123274
Apr. 16, 2013 (JP) .................................. 2013-085900

(51) Int. Cl.
G06T 11/00 (2006.01)
H04N 1/60 (2006.01)
(Continued)

(52) U.S. Cl.
CPC ............... *G06T 11/001* (2013.01); *G06T 5/007* (2013.01); *G09G 5/06* (2013.01); *H04N 1/6058* (2013.01); *G09G 2340/06* (2013.01)

(58) Field of Classification Search
USPC .................................................. 382/166–167
See application file for complete search history.

(56) References Cited

U.S. PATENT DOCUMENTS

| 6,765,586 B2 * | 7/2004 | Yamazaki | H04N 1/6058 345/590 |
| 7,126,718 B1 * | 10/2006 | Newman | H04N 1/6058 358/1.1 |

(Continued)

FOREIGN PATENT DOCUMENTS

| JP | 2008-271232 | 11/2008 |
| JP | 2009-130841 | 6/2009 |

(Continued)

OTHER PUBLICATIONS

International Search Report—PCT/JP2013/064012—Aug. 27, 2013.
(Continued)

*Primary Examiner* — Ishrat I Sherali
(74) *Attorney, Agent, or Firm* — Young & Thompson

(57) ABSTRACT

In the image processing apparatus, Input transform into an input color space is performed on input image data; After the input transform, transform processing of transforming chroma or chromaticity of the input image data or chroma or chromaticity in the input color space is performed so as to reduce a difference between a space of chroma or chromaticity of the input image data and a space of chroma or chromaticity in the input color space to acquire transformed image data; and Output transform into an output color space is performed on the transformed image data using a three-dimensional lookup table including inverse transform processing of returning the chroma or chromaticity of the transformed image data to the chroma or chromaticity of the input image data to acquire output image data.

13 Claims, 6 Drawing Sheets

(51) Int. Cl.
*G06T 5/00* (2006.01)
*G09G 5/06* (2006.01)

(56) References Cited

U.S. PATENT DOCUMENTS

2003/0001860 A1* 1/2003 Yamazaki ............ H04N 1/6058
345/590
2005/0276473 A1* 12/2005 Um ...................... H04N 1/6061
382/167
2008/0259371 A1 10/2008 Ito et al.
2013/0016901 A1 1/2013 Iwaki

FOREIGN PATENT DOCUMENTS

JP 2010-074270 4/2010
JP 2011-155352 8/2011
JP 2011-223568 11/2011

OTHER PUBLICATIONS

Specification—S-2008-001 Academy Color Encoding Specification (ACES), The Academy of Motion Picture Arts and Sciences, Science and Technology Council, Image Interchange Framework Subcommittee, Version 1.0, Aug. 12, 2008, pp. 1-30.

* cited by examiner

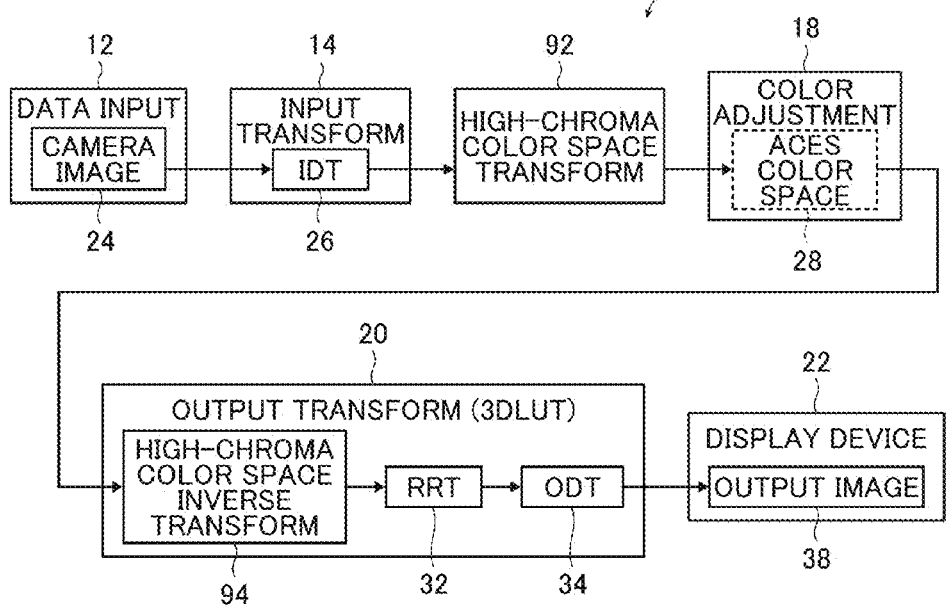
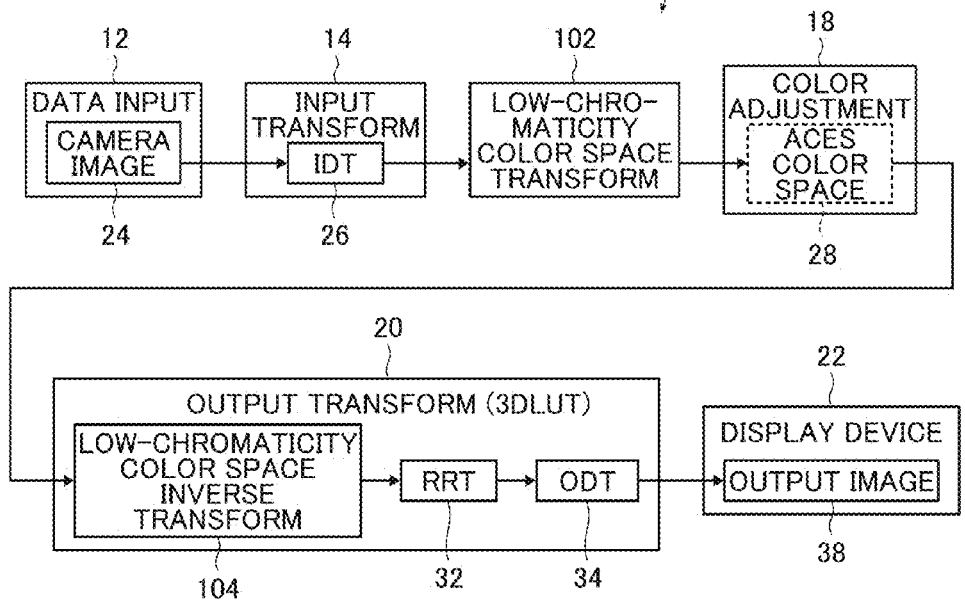

IMAGE PROCESSING METHOD, IMAGE PROCESSING APPARATUS, AND IMAGE PROCESSING PROGRAM

CROSS-REFERENCE TO RELATED APPLICATIONS

This application is a Continuation of PCT International Application No. PCT/JP2013/064012 filed on May 21, 2013, which claims priority under 35 U.S.C. §119(a) to Japanese Application No. 2012-123274 filed on May 30, 2012 and Japanese Application No. 2013-085900 filed on Apr. 16, 2013. Each of the above applications is hereby expressly incorporated by reference, in its entirety, into the present application.

BACKGROUND OF THE INVENTION

This invention relates to an image processing method, an image processing apparatus, and an image processing program, and more particularly, to an image processing method and an image processing apparatus which can improve the accuracy of color space transform of image data having a color space of a wide dynamic range, particularly, the accuracy of the color space transform using a three-dimensional lookup table (hereinafter, also referred to as "3DLUT"), an image processing program for causing a computer to execute the image processing method, and a computer-readable recording medium having the image processing program recorded thereon.

Scene-referred image representations having exact color information of imaged objects and sights are used for the purpose of exact color reproduction and are used as a reference of a captured image in color management. For example, the Academy of Motion Picture Arts and Sciences (AMPAS) defined a scene-referred wide dynamic range image color space (Academy Color Encoding Specification (ACES) color space), which is described in Non-Patent Document 1 (Specification S-2008-001, Academy Color Encoding Specification (ACES), The Academy of Motion Picture Arts and Sciences, Science and Technology Council, Image Interchange Framework Subcommittee, Version 1.0, Aug. 12, 2008) in color management for movie production and uses it as a reference for matching colors of images captured with various cameras.

The ACES color space has a very wide dynamic range as described above, and image data of pixels is expressed as floating point numbers. At the time of image transform or the like, it is necessary to deal with the image data of a wide dynamic range as an input.

Output-referred image data is obtained by performing reference rendering transform (RRT), which is called rendering, on the image data in the ACES color space. The rendering (RRT) serves as contrast or color transform according to observation environments (brightness or color tone of a light source) and color transform for desirable reproduction (memory colors such as desirable flesh color, sky, and green). In the standard of AMPAS, the rendering (RRT) is defined by complicated numerical expressions. However, in an actual color transform system, these complicated numerical expressions can be hardly used without any change and thus need to be replaced with a three-dimensional lookup table (3DLUT).

The 3DLUT is a table in which output values Ro, Go, and Bo can be arbitrarily set for combinations of input values Ri, Gi, and Bi, where the input values can be set to be discrete and an input between the discrete values can be obtained from preceding and subsequent values thereof by interpolation.

An example of the table indicating the 3DLUT is shown in Table 1.

TABLE 1

| Ri | Gi | Bi | Ro | Go | Bo |
|---|---|---|---|---|---|
| 0 | 0 | 0 | 0.12 | 0.08 | 0.01 |
| 0 | 0 | 8 | 0.22 | 0.07 | 6.45 |
| 0 | 0 | 16 | 0.31 | 0.05 | 15.23 |
| . | . | . | . | . | . |
| . | . | . | . | . | . |
| 0 | 8 | 0 | 0.21 | 11.25 | 1.35 |
| . | . | . | . | . | . |
| . | . | . | . | . | . |
| 256 | 256 | 256 | 238.12 | 248.35 | 255.56 |

As the input values of the 3DLUT, combinations of R, G, and B of the same values with equal divisions are widely used from the viewpoint of convenience of operation. When the input values of the 3DLUT are expressed in a three-dimensional space of R, G, and B, the input values can be expressed as a grid-like cube illustrated in FIG. 11.

The 3DLUT illustrated in FIG. 11 covers a space of combination of all R, G, and B values in a range of 0 to 256.

In the case where transform from a color space of a wide dynamic range such as the ACES color space is performed using the 3DLUT, the range to be covered with the 3DLUT is broadened and thus high-accuracy transform cannot be performed without taking a large number of coordinates (grid points) of the input values designated discretely in the 3DLUT.

Accordingly, in the case where an image having a wide dynamic range is a target of transform, since outdoor sunlight is equal to or greater than 10000 cd/m$^2$, moonlight is approximately 0.01 cd/m$^2$, and a dynamic range is 6 (=Log$_{10}$(10000/0.01)), it is thus necessary to apply a lookup table (hereinafter, also referred to as LUT) covering this range. In general, since input values of an LUT are values of equal-interval steps, 10$^6$=1000000 input values are required to cover the wide dynamic range, and besides, there is a problem in that a resolution is roughened in a dark area, and the human perception has a Log function relationship for brightness (Weber-Fechner's Law). Therefore, a method of implementing an LUT after performing Log transform on image data having linear brightness is suitably used. By applying the 3DLUT having input grid points of equal intervals to the data subjected to the Log transform, it is possible to approximate the transform with data, which is discretized by distribution for human perception.

Therefore, in a video transform architecture (a logical structure of computer hardware performing an image transform processing) proposed by the AMPAS, the 3DLUT is adopted to transform from the ACES color space into a color space for an output device.

FIG. 12 illustrates an image transform processing system 120 constructed on the basis of the video transform architecture proposed by the AMPAS.

In the image transform processing system 120 illustrated in FIG. 12, first, a camera image (video) 124 captured with a digital camera as an input device is input to a data input unit 122 and is acquired in the image transform processing system 120.

Image data of the camera image 124 (the color space of the digital camera) is transformed through input device transform (IDT) 128 or the like in an input transform unit 126 into image data of an ACES color space (input color space) 132 that is independent from the input device.

The image data transformed into the ACES color space 132 is subjected to editing/processing such as color adjustment in the ACES color space 132 in a color adjusting unit 130, is then transformed into an output color space (Output Color Encoding Specification (OCES) color space (not illustrated)) which is a color space common to the ACES color space 132 through reference rendering transform (RRT) 136 in an output transform unit 134, and is then transformed into image data of an output image 142 displayed on a display device 140 such as a digital projector through output device transform (ODT) 138.

In the image transform processing system 120 illustrated in FIG. 12, a 3DLUT is adopted to the combination of the RRT 136 and the ODT 138 in the output transform unit 134.

The 3DLUT used in the output transform unit 134 can be a 3DLUT 46 applied so as to entirely cover a color space 44 which is illustrated in FIG. 3B and which is the ACES color space 132 transformed through the IDT 128.

SUMMARY OF THE INVENTION

However, in the image transform processing system 120 illustrated in FIG. 12, when color transform such as the rendering (RRT 136) of a wide dynamic range in the ACES color space 132 or the like is expressed by the three-dimensional lookup table (3DLUT 46) as illustrated in FIG. 3B, data between neighboring grid points is calculated by linear interpolation, and thus there is a problem in that as the nonlinearity of the color transform becomes stronger, the accuracy of the color transform degrades, if the number of grid points is not increased. Particularly, since the human perception is sensitive to an error in the vicinity of gray, there is a problem in that color undulation, tone jump, or the like is observed.

The grid points of the 3DLUT are generally $17^3$, $33^3$, $66^3$, and the like, and when the number of grid points is increased to enhance the accuracy of color transform, there is a problem in that the amount of data becomes enormous or the processing speed of the color transform decreases.

The invention is made to solve the above-mentioned problems in the prior art and an object thereof is to provide an image processing method and an image processing apparatus that can improve the accuracy of color space transform, particularly, color space transform using a three-dimensional lookup table, of image data having a color space of a wide dynamic range and particularly, can increase the density of grid points in the vicinity of gray without increasing the number of grid points of the three-dimensional lookup table, an image processing program causing a computer to execute the image processing method, and a computer-readable recording medium having the image processing program recorded thereon.

To attain the above object, the present invention provides an image processing method of sequentially performing input transform into an input color space and output transform into an output color space on input image data to transform the input image data into output image data, comprising:

after the input transform, performing transform processing of transforming chroma or chromaticity of the input image data or chroma or chromaticity in the input color space so as to reduce a difference between a space of chroma or chromaticity of the input image data and a space of chroma or chromaticity in the input color space so that the space of chroma or chromaticity of the input image data effectively uses the space of chroma or chromaticity in the input color space to acquire transformed image data; and in the output transform, performing image processing of transforming the transformed image data into the output image data using a three-dimensional lookup table including inverse transform processing of returning the chroma or chromaticity of the transformed image data to the chroma or chromaticity of the input image data.

Also, the present invention provides an image processing method of sequentially performing input transform into an input color space, color adjustment, and output transform into an output color space on input image data of an input device to transform the input image data into output image data of an output device, comprising:

after the input transform, performing transform processing of transforming chroma of the input image data or chroma in the input color space so as to reduce a difference between a space of chroma of the input image data and a space of chroma in the input color space so that the space of chroma of the input image data effectively uses the space of chroma in the input color space to acquire transformed image data; and in the output transform, performing inverse transform processing of returning the chroma of the transformed image data to the chroma of the input image data and image processing of transforming the transformed image data into the output image data.

Also, the present invention provides an image processing method of sequentially performing input transform into an input color space and integer encoding on input image data, transmitting the integer-encoded transformed image data, and transforming the transmitted transformed image data into output image data in an output color space, comprising:

after the input transform, performing transform processing of transforming chroma of the input image data or chroma in the input color space so as to reduce a-difference between a space of chroma of the input image data and a space of chroma in the input color space so that the space of chroma of the input image data effectively uses the space of chroma in the input color space to acquire transformed image data; and in the output transform, performing inverse transform processing of returning the chroma of the transformed image data to the chroma of the input image data and image processing of transforming the transformed image data into the output image data.

Also, the present invention provides an image processing apparatus comprising:

an input transform unit configured to perform input transform into an input color space on input image data;

a chroma/chromaticity optimizing unit configured to perform transform processing of transforming chroma or chromaticity of the input image data or chroma or chromaticity in the input color space so as to reduce a difference between a space of chroma or chromaticity of the input image data and a space of chroma or chromaticity in the input color space so that the space of chroma or chromaticity of the input image data effectively uses the space of chroma or chromaticity in the input color space to acquire transformed image data, after the input transform; and an output transform unit configured to perform output transform into an output color space on the transformed image data to acquire output image data, wherein in the output transform, the output transform unit performs image processing of transforming the transformed image data into the output image data using a three-dimensional lookup table including inverse transform processing of returning the chroma or chromaticity of the transformed image data to the chroma or chromaticity of the input image data.

Also, the present invention provides an image processing apparatus comprising:

an input transform unit configured to perform input transform into an input color space on input image data of an input device;

a chroma/chromaticity optimizing unit configured to perform transform processing of transforming chroma or chromaticity of the input image data or chroma or chromaticity in the input color space so as to reduce a difference between a space of chroma or chromaticity of the input image data and a space of chroma or chromaticity in the input color space so that the space of chroma or chromaticity of the input image data effectively uses the space of chroma or chromaticity in the input color space to acquire transformed image data, after the input transform;

a color adjusting unit configured to perform color adjustment on the transformed image data acquired by the chroma/chromaticity optimizing unit; and an output transform unit configured to perform output transform into an output color space of an output device on the transformed image data subjected to color adjustment by the color adjusting unit to acquire output image data, wherein in the output transform, the output transform unit performs inverse transform processing of returning the chroma or chromaticity of the transformed image data subjected to color adjustment by the color adjusting unit to the chroma or chromaticity of the input image data and image processing of transforming the transformed image data subjected to color adjustment by the color adjusting unit into the output image data.

Also, the present invention provides an image processing apparatus comprising:

an input transform unit configured to perform input transform into an input color space on input image data;

a chroma/chromaticity optimizing unit configured to perform transform processing of transforming chroma or chromaticity of the input image data or chroma or chromaticity in the input color space so as to reduce a difference between a space of chroma or chromaticity of the input image data and a space of chroma or chromaticity in the input color space so that the space of chroma or chromaticity of the input image data effectively uses the space of chroma or chromaticity in the input color space to acquire transformed image data, after the input transform;

an integer encoding unit configured to perform integer encoding on the transformed image data acquired by the chroma/chromaticity optimizing unit; and an output transform unit configured to perform output transform into an output color space on the transformed image data subjected to integer encoding by the integer encoding unit to acquire output image data, wherein in the output transform, the output transform unit performs inverse transform processing of returning the chroma or chromaticity of the transformed image data to the chroma or chromaticity of the input image data and image processing of transforming the transformed image data into the output image data.

Also, the present invention provides a non-transitory computer-readable recording medium having recorded thereon an image processing program for causing a computer to execute respective steps of the image processing method according to above.

According to the invention, the constitution described above can improve the accuracy of color space transform of an image data having a color space of a wide dynamic range, particularly, color space transform using a three-dimensional lookup table and, particularly, can increase the density of grid points in the vicinity of gray without increasing the number of grid points of the three-dimensional lookup table used in image-encoding for image processing or image transmission.

BRIEF DESCRIPTION OF THE DRAWINGS

FIG. 5 is a block diagram schematically illustrating a second embodiment of the configuration of the image processing apparatus that performs the image processing method according to the invention.

FIG. 6 is a block diagram schematically illustrating a third embodiment of the configuration of the image processing apparatus that performs the image processing method according to the invention.

DETAILED DESCRIPTION OF THE INVENTION

Hereinafter, an image processing method, an image processing apparatus, an image processing program, and a recording medium according to the invention will be described in detail with reference to exemplary embodiments illustrated in the accompanying drawings.

Figure 1:
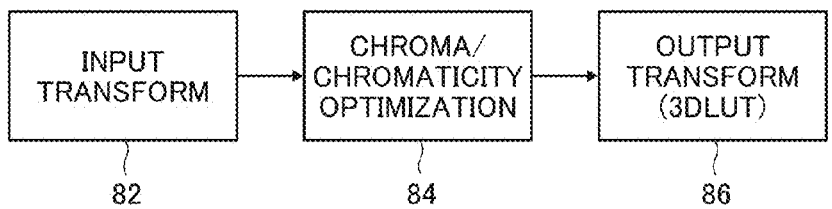
FIG. 1 is a block diagram illustrating a configuration of an image processing apparatus that performs an image processing method according to the invention.

FIG. 1 is a block diagram illustrating a configuration of an image processing apparatus that performs an image processing method according to the invention. The image processing apparatus 80 illustrated in the drawing sequentially performs input transform into an input color space and output transform into an output color space on input image data to transform the input image data into output image data, and includes an input transform unit 82, a chroma/chromaticity optimizing unit 84, and an output transform unit 86.

The input transform unit 82 performs transform (input transform) on input image data into an input color space such as an ACES color space of the AMPAS.

After the input transform by the input transform unit 82, the chroma/chromaticity optimizing unit 84 performs transform processing of transforming (optimizing) chroma or chromaticity of the input image data or chroma or chromaticity in the input color space so as to reduce a difference between a space of chroma or chromaticity of the input image data captured with an input device such as a digital camera and a space of chroma or chromaticity in the input color space having a wide dynamic range such as the ACES color space 20 so that a space of chroma or chromaticity of the input image data captured with an input device effectively uses the space of chroma or chromaticity in the input color space having a wide dynamic range, that is, so as to match the space of chroma or chromaticity used for actual image data, and thus acquires transformed image data.

The output transform unit 86 performs transform (output transform) on the transformed image data acquired by the chroma/chromaticity optimizing unit 84 into the output color space to acquire output image data. In addition, in the output transform, the output transform unit 86 performs image processing of transforming the transformed image data into the output image data using a three-dimensional lookup table (3DLUT) including inverse transform processing of returning the chroma or chromaticity of the transformed image data to the chroma or chromaticity of the input image data.

In a first embodiment of the invention, after the input transform by the input transform unit 82, the chroma/chromaticity optimizing unit 84 performs transform processing of increasing chroma of the input image data to acquire transformed image data.

Then, in the output transform, the output transform unit 86 performs image processing of transforming the transformed image data into the output image data using a 3DLUT including inverse transform processing of decreasing the amount of chroma increased in the transformed image data to return the chroma of the transformed image data to the chroma of the input image data.

In a second embodiment of the invention, after the input transform by the input transform unit 82, the chroma/chromaticity optimizing unit 84 performs transform processing of transforming the input image data in the input color space into image data in a high-chroma color space in which chroma has increased with respect to the input color space to acquire transformed image data.

Then, in the output transform, the output transform unit 86 performs image processing of transforming the transformed image data to the output image data using a 3DLUT including inverse transform processing of inversely transforming the transformed image data in the high-chroma color space into the input image data in the input color space.

In a third embodiment of the invention, after the input transform by the input transform unit 82, the chroma/chromaticity optimizing unit 84 performs transform processing of transforming the input image data in the input color space into image data in a first color space composed of brightness and chromaticity and transforming the first color space to a low-chromaticity color space in which the chromaticity of the first color space has decreased to acquire transformed image data.

Then, in the output transform, the output transform unit 86 performs image processing of transforming the transformed image data into the output image data using a 3DLUT including inverse transform processing of inversely transforming the low-chromaticity color space into the first color space and inversely transforming the image data in the inversely-transformed first color space into the input image data in the input color space.

In a fourth embodiment of the invention, after the input transform by the input transform unit 82, the chroma/chromaticity optimizing unit 84 performs transform processing of transforming the input image data in the input color space into image data in a second color space composed of brightness, chroma, and hue and transforming the second color space to a low-chroma color space in which the chroma of the second color space has decreased to acquire transformed image data.

Then, in the output transform, the output transform unit 86 performs image processing of transforming the transformed image data into the output image data using a 3DLUT including inverse transform processing of inversely transforming the low-chroma color space into the second color space and inversely transforming the image data in the inversely-transformed second color space into the input image data in the input color space.

Next, the general operation of the image processing apparatus 80 will be described below with reference to the image processing method according to the invention.

In the image processing apparatus 80, transform (input transform) of the input image data into the input color space is performed by the input transform unit 82.

Subsequently, by the chroma/chromaticity optimizing unit 84, transform processing of transforming the chroma or chromaticity of the input image data or the chroma or chromaticity of the input color space is performed so as to reduce a difference between a space of chroma or chromaticity of the input image data and a space of chroma or chromaticity in the input color space so that the space of chroma or chromaticity of the input image data effectively uses the space of chroma or chromaticity in the input color space, and thus transformed image data is acquired.

Then, by the output transform unit 86, image processing of transforming the transformed image data into the output image data is performed using a 3DLUT including inverse transform processing of returning the chroma or chromaticity of the transformed image data to the chroma or chromaticity of the input image data.

In this way, in the image processing apparatus 80, by reducing the difference between a space of chroma or chromaticity of the input image data and a space of chroma or chromaticity in the input color space so that the space of chroma or chromaticity of the input image data effectively uses the space of chroma or chromaticity in the input color space and inputting the resultant input image data to the 3DLUT, it is possible to improve utilization rate of data of the respective grid points of the 3DLUT without increasing the number of grid points of the 3DLUT. Therefore, it is possible to increase the density of the grid points in the vicinity of gray and thus to improve the accuracy of the color space transform of image data having a color space of a wide dynamic range using the 3DLUT.

That is, by reducing the difference between the color space of the input image data and the input color space, it is possible to improve the utilization rate of the input color space and thus to improve the accuracy of transform.

First to fourth embodiments of the image processing apparatus that performs the image processing method according to the invention will be described below.

First, an image processing apparatus according to the first embodiment will be described.

Figure 2:
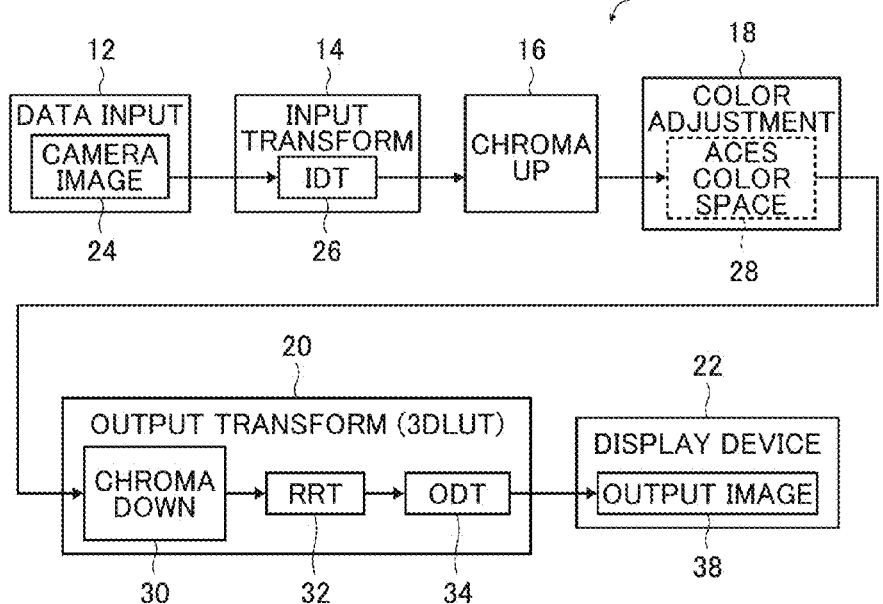
FIG. 2 is a block diagram schematically illustrating a first embodiment of the configuration of the image processing apparatus that performs the image processing method according to the invention.

FIG. 2 is a block diagram schematically illustrating the first embodiment of the configuration of the image processing apparatus that performs the image processing method according to the invention.

As illustrated in FIG. 2, the image processing apparatus 10 is basically constructed on the basis of the color transform architecture of the AMPAS and includes a data input unit 12, an input transform unit 14, a chroma increase processing unit 16, a color adjusting unit 18, an output transform unit 20, and a display device 22. The input transform unit 14 includes an IDT 26 and the output transform unit 20 includes a chroma decrease processing unit 30, an RRT 32, and an ODT 34.

The data input unit 12 is a unit to which camera image data 24 captured with a digital camera or the like as an input device is input and by which the camera image data 24 is acquired in the image processing apparatus 10. The camera image data 24 acquired by the data input unit 12 is input to the input transform unit 14.

Figure 12:
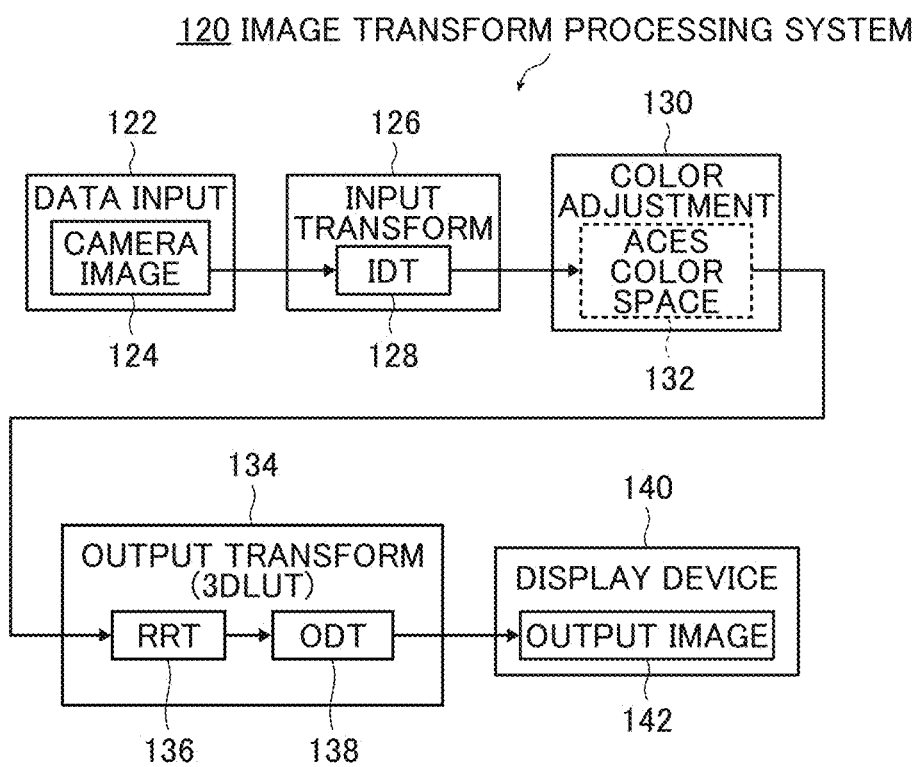
FIG. 12 is a block diagram illustrating the conventional image transform processing system.

The input transform unit 14 includes the IDT 26, like the IDT 128 of the image transform processing system 120 illustrated in FIG. 12 based on the color transform architecture of the AMPAS and transforms (input transforms) the camera image data 24 into image data in the ACES color space (input color space) 28 of the AMPAS, which is then subjected to editing/processing such as color adjustment by the color adjusting unit 18.

Similarly to the IDT 128 illustrated in FIG. 12, the IDT 26 transforms the camera image data 24 (the color space of the digital camera or the like) captured with the input device such as a digital camera into the image data in the ACES color space 28 which is the common color space of the input defined as a scene-referred color space and which is independent from the input device such as a digital camera.

The input transform unit 14 may correct the image data, which has been transformed into image data in the ACES color space 28 by the IDT 26, depending on the individual difference of input devices.

By doing so, since plural pieces of camera image data 24 captured with various input devices such as plural different digital cameras are transformed into plural pieces of image data in the ACES color space 28 defined as a scene-referred color space, the plural pieces of input image data of the same scene are transformed into plural pieces of image data having the same color.

Accordingly, even plural pieces of camera image data captured with various input devices such as plural digital cameras of different makers or types can be transformed into plural pieces of image data in the ACES color space 28 which are matched with high accuracy.

The chroma increase processing unit 16 is a characterized part of the invention, is an example of the chroma/chromaticity optimizing unit 84 illustrated in FIG. 1, and performs transform processing of increasing the chroma (chroma UP) of the image data in the ACES color space 28 transformed by the IDT 26 to acquire transformed image data.

Figure 3A:
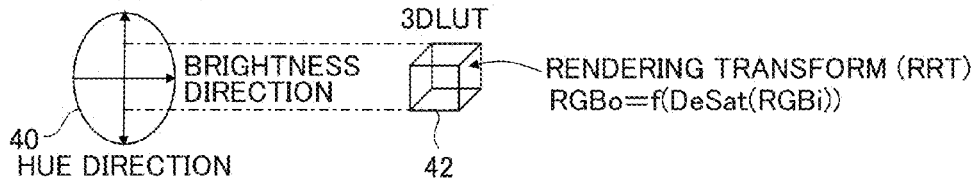
FIGS. 3A and 3B are conceptual diagrams respectively illustrating the image processing method according to the invention and the conventional image processing method.
Figure 3B:
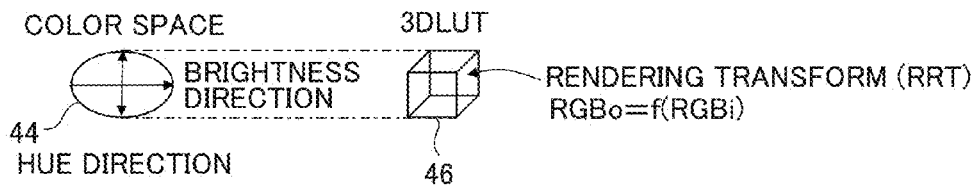

As illustrated in FIG. 3A, a color space 40 in which chroma has increased with respect to an original color space 44 illustrated in FIG. 3B is defined, and a 3DLUT 42 which has the same number of grid points as the conventional three-dimensional lookup table (3DLUT) 46 defined so as to entirely cover the original color space 44 illustrated in FIG. 3B is defined so as to be applied to the central area of the color space 40.

Here, the input color space 40 used in the invention is a color space having the same width in the gray (brightness) and a greater width in the hue direction as compared to the original color space 44. That is, as compared to the original color space 44, the input color space 40 extends in the hue direction and thus the chroma increases, but does not extend and is constant in the brightness direction and thus the brightness does not vary.

As described above, the 3DLUT 46 illustrated in FIG. 3B is a 3DLUT used in the output transform unit 134 illustrated in FIG. 12, the 3DLUT 42 of the invention illustrated in FIG. 3A is a 3DLUT used in the output transform unit 20 to be described later, and the both of 3DLUT 46 and 3DLUT 42 have the same number of grid points, but the 3DLUT 42 of the invention is different from the conventional 3DLUT 46, in that the 3DLUT of the invention includes processing of decreasing the chroma increased by the chroma increase processing unit 16 to return the chroma to the original chroma.

In this way, by performing color transform from the color space of which the chroma has increased without changing the number of grid points (size) of the 3DLUT 42 of the invention, a disadvantage that transform of an area having high chroma cannot be performed arises. However, in consideration of a color space of a wide dynamic range such as the ACES color space 28 having, for example, a color space of a range of −4 to +2 in terms of Log, a high-chroma color is, for example, a color of RGB combination (−4, −3, +1) and is equivalent to a color of brightness combination (0.01%, 0.1%, 1000%) in terms of antilogarithm. A subject having a color of such an extreme brightness is hardly present in reality.

Accordingly, when a 3DLUT having a limited number of grid points is used, it is effective to narrow the coverage in the chroma direction to a range present in real scenes and to exclude a high-chroma range not present in real scenes from the transform target of the 3DLUT.

That is, in the chroma increase processing in the chroma increase processing unit 16, since the area to which the 3DLUT 42 illustrated in FIG. 3A is applied only has to cover the image data in the entire reproducible color space of the output image 38 of the display device 22 to be described later, that is, the image data in the entire output color space of the ODT 34 of the output transform unit 20, the output color space of the ODT 34 can be inversely transformed so that the output color space is adjusted to be an area in the ACES color space 28.

Accordingly, the chroma increase processing that is performed by the chroma increase processing unit 16 is not particularly limited as long as it can be adjusted in this way.

For example, it is preferable that the chroma increase processing be performed in a logarithmic (Log) color space using logarithmic (Log) transformed values of the input camera image data and the chroma-increased image data. The reason is that since in the invention, an image having a wide dynamic range is used as a target, it is necessary to cover the wide dynamic range as described above, the resolution is roughened in a dark area, and the human perception of brightness has a Log function relationship.

In addition, the chroma increase processing by the chroma increase processing unit 16 is preferably matrix transform processing and is more preferably performed, for example, using an R (Red), G (Green), and B (Blue) matrix or a YCC matrix. The reason is that the matrix operation can be performed as a simple operation, the chroma increase processing by the chroma increase processing unit 16 and the chroma decrease processing by the chroma decrease processing unit 30 to be described later can be simply performed, the chroma decrease processing of the inverse transform processing can be easily applied to the 3DLUT, and the interpolation of the grid points in the 3DLUT is linear transform and thus the accuracy of the simple linear transform is higher than that of a combination with nonlinear transform.

Moreover, when the chroma increase processing is performed by the chroma increase processing unit 16, it is preferable that the rate of increase of chroma be changed depending on the distance of the input camera image data from gray, specifically, the distance of the image data from gray in the ACES color space 28 which is a common color space of the input and into which the camera image data is transformed by the IDT 26. The reason is that the human perception is sensitive to a difference in the vicinity of gray.

The rate of increase of chroma may be changed depending on YCC, brightness, or the like instead of changing the rate of increase of chroma depending on the distance from gray.

A specific example of the chroma increase processing by the chroma increase processing unit 16 will be described later.

Similarly to the color adjusting unit 130 in the ACES color space 132 illustrated in FIG. 12, the color adjusting unit 18 is used to adjust colors of an image, for example, colors of a scene, in the ACES color space 28; on the basis of a color adjustment parameter or the like. For example, in case of a video such as a movie, the color adjusting unit 18 performs color adjustment for direction suitable to atmosphere of video contents, stories, or scenes. Since the color adjusting unit 18 transforms image data into color-adjusted image data in the ACES color space 28, the color space of the color-adjusted image data is also the ACES color space 28. Here, in the color adjusting unit 18, transform such as the color adjustment is performed in the ACES color space 28 in a state where the chroma is increased. Since the transform such as the color adjustment by the color adjusting unit 18 is a transform in a state where the chroma is increased, it has an effect that even fine portions existing in a scene can be transformed.

The output transform unit 20 transforms (output transforms) the color-adjusted transformed image data in the ACES color space 28 color-adjusted by the color adjusting unit 18 into output image data for displaying an output image 38 on a display screen of the display device 22, and includes the chroma decrease processing unit 30, the RRT 32, and the ODT 34 as described above.

The output transform unit 20 does not individually perform the chroma decrease processing by the chroma decrease processing unit 30, the transform into the OCES color space by the RRT 32, and the output device transform by the ODT 34, but performs the three processings using a single 3DLUT.

Since as the 3DLUT 42 illustrated in FIG. 3A, the 3DLUT of the output transform unit 20 covers only an area obtained by cutting out an area which is not present at all or hardly present in an actual scene on both increased (extended) sides of the color space 40 of which the chroma has increased (extended in the hue direction), the input of the 3DLUT is coincide with grid points in the covered area.

The chroma decrease processing unit 30 decreases the chroma which has been increased by the chroma increase processing unit 16, that is, decreases the chroma by the amount of chroma increased, to return the chroma to the original chroma.

The chroma decrease processing unit 30 performs processing of decreasing the chroma in the output transform including the rendering transform (RRT) 32 using the 3DLUT 42 from the color space 40 of which the chroma has increased, as illustrated in FIG. 3A. Accordingly, since the chroma increased by the chroma increase processing unit 16 is decreased by the chroma decrease processing unit 30, the total color transform result does not change. In the color space 40 of which the chroma increased, the width of the space is not changed in the gray (brightness) direction, and accordingly, the transform of decreasing the chroma in the color space 40 extended in only the hue direction before the RRT 32 is expressed by the 3DLUT 42 and is applied thereto.

Here, the decrease of chroma (chroma DOWN) in the chroma decrease processing unit 30 can be operated, for example, using Expression (1).

$$G_{ray}=(R_i+G_i+B_i)/3$$

$$R_o=R_i-(R_i-G_{ray})*k$$

$$G_o=G_i-(G_i-G_{ray})*k$$

$$B_o=B_i-(B_i-G_{ray})*k \quad (1)$$

Here, $R_i$, $G_i$, and $B_i$ are RGB input values (image data) of the chroma increase processing, $R_o$, $G_o$, and $B_o$ are RGB output values (image data) of the chroma decrease processing, $G_{ray}$ is the average value of the RGB input values and is a value of gray, and k is a chroma decrease coefficient (0 to 1), where 0 denotes no chroma decrease and 1 denotes zero chroma representing gray.

On the other hand, when the decrease of chroma in the chroma decrease processing unit 30 is expressed by Expression (1), the increase of chroma (chroma UP) in the chroma increase processing unit 16 is given as the inverse transform of the above and can be operated using Expression (2).

$$R_o=(R_i-G_{ray}*k)/(1-k)$$

$$G_o=(G_i-G_{ray}*k)/(1-k)$$

$$B_o=(B_i-G_{ray}*k)/(1-k) \quad (2)$$

Here, $R_i$, $G_i$, and $B_i$ are RGB input values (image data) of the chroma increase processing, and $R_o$, $G_o$, and $B_o$ are RGB output values (image data) of the chroma decrease processing.

The operation of the chroma increase processing defined in this way preferably uses an operation matrix to which Expression (2) is modified.

In addition, in the increase of chroma by the chroma increase processing unit 16, it is possible to change the distance from gray by changing the coefficient k between a value more than 0 and a value less than 1.

Here, in the transform by the ODT 34 of the output transform unit 20, data of at least the entire area of the color space of the output device only has to be expressed. Accordingly, when the color space of the output device is inversely transformed into the ACES color space 28 and enters not the entire ACES color space 28 but a predetermined area thereof, the value of the coefficient k can be calculated as a value in a range covering the predetermined area. The value of the coefficient k may be calculated from the color space of the output device, but the invention is not limited to this, and a preliminarily set value, for example, 0.5, may be used.

Next, similarly to the RRT 136 illustrated in FIG. 12, the RRT 32 performs rendering (editing/processing) and performs rendering transform of transforming into an output standard color space that is independent from the output device, for example, the OCES color space. Specific example of the rendering includes adjustment of contrast of an output image and colors of the output image depending on the brightness of an environment in which the output image is viewed, the color tone of a light source for viewing, or the like, and desirable reproduction of colors of the output image depending on the application of the output image or the like, for example, reproduction of colors desirable for viewing, which is not reproduction of colors of actual objects such as blue of sky or green of trees but reproduction of colors depending on viewing targets such as movies, televisions (TV), indoor advertisements, and outdoor advertisements.

That is, as illustrated in FIG. 3A, the RRT 32 performs rendering transform f on the image data DeSat(RGBi(Ri, Gi, Bi)) in the ACES color space 28 of which the chroma has decreased by the chroma decrease processing unit 30 according to the following Expression (3) to transform the image data into image data RGBo(Ro, Go, Bo) in the OCES color space.

$$RGBo = f(DeSat(RGBi)) \quad (3)$$

Next, similarly to the ODT 138 illustrated in FIG. 12, the ODT 34 performs color space transform or gamma (γ value) transform or calibration of the display device 22 and sends the output image 38 as the output image data to the display device 22. That is, the ODT 34 transforms the output standard color space that is independent from the output device into the output device color space that is dependent on the display device 22 as an actual output device, and output-device-transforms the image data in the output standard color space into the output image data for display on the display device 22 as an output device.

In the output transform unit 20 according to this embodiment, three processings of the chroma decrease processing by the chroma decrease processing unit 30, the transform into the OCES color space by the RRT 32, and the output device transform by the ODT 34 are performed as single processing using a single 3DLUT, but since the input values of the 3DLUT are image data in the ACES color space 28 of which the chroma has been increased by the chroma increase processing unit 16 and the grid points can be taken in an area other than a portion having high chroma, points in the input color space and fine color densities (brightness, hue, and chroma) which are present in a scene can be reproduced in the output color space with high accuracy.

The display device 22 receives the output image data in the output device color space, that is, the color space of the display device 22, output from the output transform unit 20, and outputs the received output image data to display the output image on the display screen thereof.

The display device 22 is not particularly limited as long as it is an output device outputting the output image, and, for example, a digital projector, a motion picture projector, a TV, and various image monitors with a large size to a small size which can output a video as the output image can be used.

Thus, in the image processing apparatus 10 according to this embodiment, it is possible to increase the density of the grid points in the vicinity of gray without increasing the number of grid points of the 3DLUT, and thus, it is possible to improve the accuracy of the color space transform of image-data with a color space of a wide dynamic range using a three-dimensional lookup table.

The image processing apparatus according to the first embodiment basically has the above-mentioned configuration.

The operations of the image processing apparatus according to the invention and the image processing method according to the invention will be described below.

Figure 4:
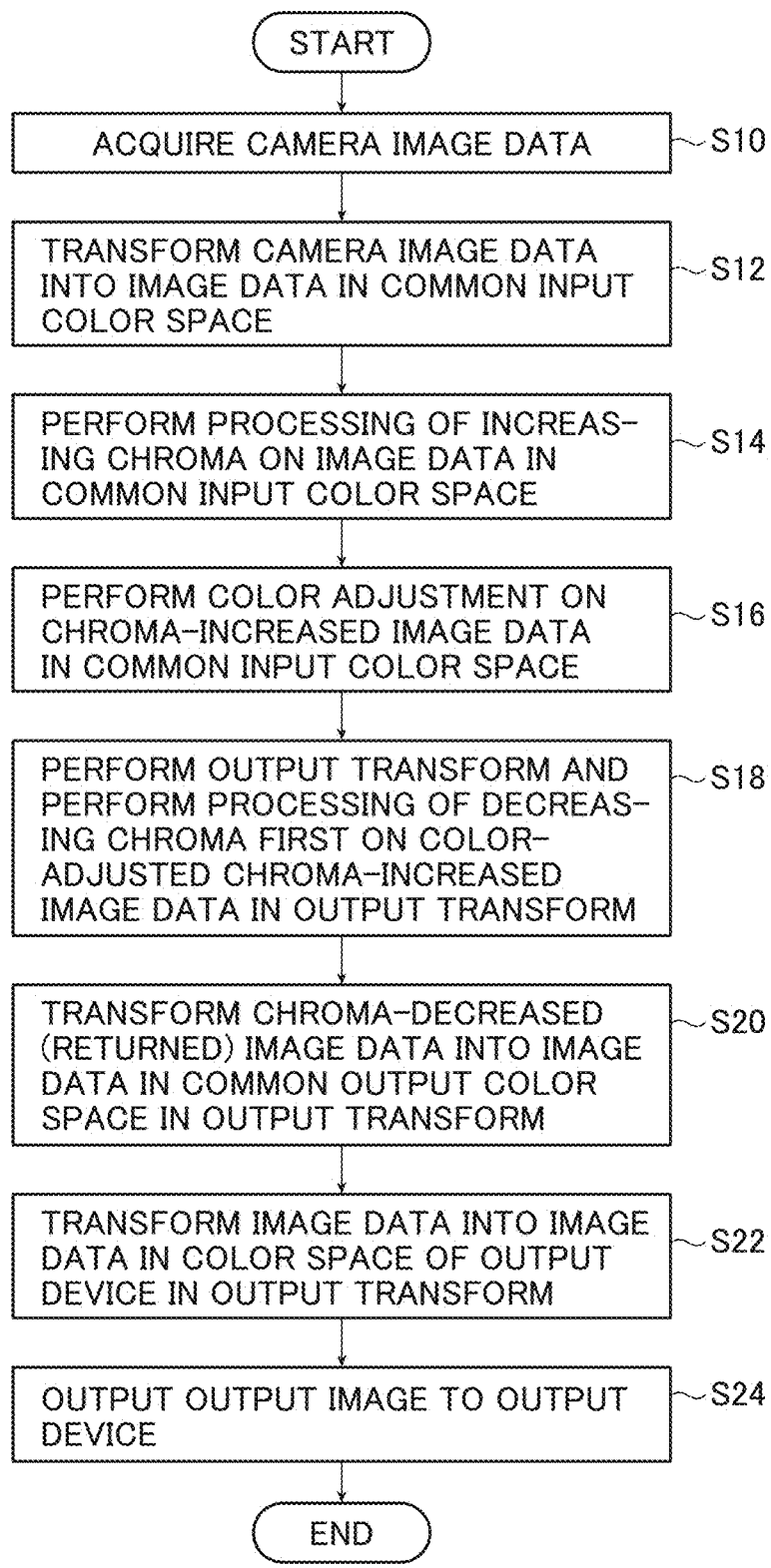
FIG. 4 is a flowchart illustrating an example of a process flow of the image processing method according to the invention.

FIG. 4 is a flowchart illustrating an example of a process flow of the image processing method according to the invention.

As illustrated in FIG. 4, in step S10, image data of a camera image 24 is input to the data input unit 12 of the image processing apparatus 10 illustrated in FIG. 2 and is acquired in the image processing apparatus 10.

Then, in step S12, the camera image data is transformed into image data in the ACES color space 28 which is a common input color space by the IDT 26 of the input transform unit 14.

Subsequently, in step S14, processing of increasing the chroma is performed on the image data in the ACES color space 28 by the chroma increase processing unit 16.

Then, in step S16, color adjustment processing is performed on the chroma-increased image data in the ACES color space 28 by the color adjusting unit 18.

Then, in steps S18 to S22, output transform processing is performed on the color-adjusted chroma-increased image data by the output transform unit 20.

First, in step S18 of the output transform, processing of decreasing the chroma of the color-adjusted chroma-increased image data (image data in the ACES color space 28) to return the chroma to the original chroma is performed by the chroma decrease processing unit 30 of the output transform unit 20.

Then, in step S20 of the output transform, the color-adjusted chroma-increased (returned) image data (the image data in the ACES color space 28) is subjected to the rendering transform and is transformed into image data in the output standard color space (for example, the OCES color space) by the RRT 32 of the output transform unit 20.

Subsequently, in step S22 of the output transform, the image data in the output standard color space (the OCES color space) is transformed into output-device-referred image data in the color space of the output device (the display device 22) by the ODT 34 of the output transform unit 20.

The chroma decrease processing, the rendering transform, and the output device transform of steps S18 to S22 are preferably performed as a single output transform processing using a single 3DLUT by the output transform unit 20.

Then, in step S24, the output-device-referred image data obtained in this way is displayed as an output image on the display screen of the display device 22 as the output device.

Thus, in the image processing method according to this embodiment, by increasing the chroma of image data and inputting the resultant image data to the 3DLUT, it is possible to efficiently use a 3DLUT without increasing the number of grid points of the 3DLUT. As a result, it is possible to increase the density of the grid points in the vicinity of gray, and thus, it is possible to improve the accuracy of the color space transform of image data with a color space of a wide dynamic range using a three-dimensional lookup table.

Therefore, the output image displayed on the display device 22 is an image in which color, chroma, and brightness are reproduced accurately even in fine portions and is an image preferably reproduced.

The image processing method according to this embodiment basically has the above-mentioned configuration.

In the above-mentioned image processing apparatus and the image processing method according to the first embodiment, the respective processings in the chroma decrease processing unit 30, the RRT 32, and the ODT 34 of the output transform unit 20 are performed as a single output transform processing using a single 3DLUT, but the invention is not limited to this. Two or more of these processings may be performed using a single 3DLUT, or may be performed without using a 3DLUT, or one or two of these processings may be performed using a 3DLUT and the other processings may be performed without using a 3DLUT.

For example, the image processing method or the image processing apparatus according to the invention can be applied to a video check and color adjustment system in which at a filming location, a captured image is transformed and displayed on a display monitor for video check and further, color adjustment is performed by the color adjusting unit 18 illustrated in FIG. 2. Here, the color adjustment result at the filming location can be transferred to post-process of video editing as a 3DLUT. At this time, it is necessary to divide the 3DLUT into a 3DLUT for input transform including the color adjustment result and a 3DLUT for output transform so that additional color adjustment in the ACES color space can be performed in the post-process. Since most of the post-process systems use only the transform in the 3DLUT, it is preferable to use the image processing method or the image processing apparatus of the invention using the ACES color space in which the chroma is emphasized.

Furthermore, in order to ensure uniformity of colors between systems, it is preferable that the image processing of the invention be used in a system not using a 3DLUT, for example, a system capable of directly calculating the operation expression of the RRT.

Next, a second embodiment of the invention will be described below.

FIG. 5 is a block diagram schematically illustrating a second embodiment of the configuration of the image processing apparatus that performs the image processing method according to the invention.

The image processing apparatus 90 illustrated in the drawing includes a high-chroma color space transform unit 92 and a high-chroma color space inverse transform unit 94 instead of the chroma increase processing unit 16 and the chroma decrease processing unit 30 in the image processing apparatus 10 according to the first embodiment illustrated in FIG. 2.

The other elements of the image processing apparatus 90 according to this embodiment are the same as in the image processing apparatus 10 according to the first embodiment and thus description thereof will not be repeated.

The high-chroma color space transform unit 92 is an example of the chroma/chromaticity optimizing unit 84 illustrated in FIG. 1. After the input transform by the input transform unit 14, the high-chroma color space transform unit 92 performs transform processing of transforming input image data in an input color space (for example, ACES color space 28) into image data in a high-chroma color space in which chroma has been increased with respect to the input color space to acquire transformed image data, as illustrated in FIG. 2.

As described above, the input image data in the input color space is hardly present in a high-chroma area, that is, an area in which the chroma is higher than a predetermined value.

Accordingly, by transforming the input image data in the input color space into the image data in the high-chroma color space through the use of the high-chroma color space transform unit 92 and applying a 3DLUT having the same number of grid points as the conventional 3DLUT defined to cover the input color space to a central area of the high-chroma color space, that is, an area in which the input image data is actually present, it is possible to increase the chroma of the input image data in the input color space and to input the resultant input image data to the 3DLUT, similarly to the chroma increase processing unit 16 of the image processing apparatus 10 according to the first embodiment.

In the output transform, the high-chroma color space inverse transform unit 94 performs image processing of transforming the transformed image data into the output image data using a 3DLUT including inverse transform processing of inversely transforming the transformed image data in the high-chroma color space into the input image data in the input color space.

Thus, similarly to the chroma decrease processing unit 30 of the image processing apparatus 10 according to the first embodiment, it is possible to transform the transformed image data to the output image data by decreasing the chroma of the transformed image data by the amount of chroma increased and returning the chroma to the chroma of the input image data.

As described above, in the image processing apparatus 90 according to the second embodiment, since the chroma of the input image data can be increased and then the resultant input image data can be input to the 3DLUT, the same effects as in the image processing apparatus 10 according to the first embodiment can be obtained.

Next, a third embodiment of the invention will be described below.

FIG. 6 is a block diagram schematically illustrating a third embodiment of the configuration of the image processing apparatus that performs the image processing method according to the invention.

The image processing apparatus 100 illustrated in the drawing includes a low-chromaticity color space transform unit 102 and a low-chromaticity color space inverse transform unit 104 instead of the chroma increase processing unit 16 and the chroma decrease processing unit 30 in the image processing apparatus 10 according to the first embodiment illustrated in FIG. 2.

The other elements of the image processing apparatus 100 according to this embodiment are the same as in the image processing apparatus 10 according to the first embodiment and thus description thereof will not be repeated.

The low-chromaticity color space transform unit 102 is an example of the chroma/chromaticity optimizing unit 84 illustrated in FIG. 1. After the input transform by the input transform unit 14, the low-chromaticity color space transform unit 102 performs transform processing of transforming input image data in an input color space, for example, input image data in an RGB color space, into image data in a first color space composed of brightness and chromaticity, such as a Ycbcr color space and an L*a*b* color space, and further transforming the first color space into a low-chromaticity color space in which the chromaticity of the first color space has decreased to acquire transformed image data.

Figure 7:
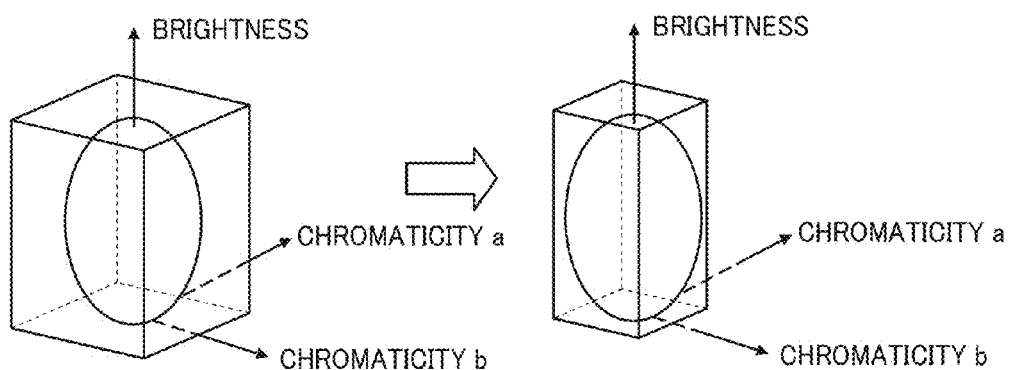
FIG. 7 is a conceptual diagram illustrating a state of transforming a first color space composed of brightness and chromaticity into a low-chromaticity color space in which the chromaticity of the first color space has decreased.

FIG. 7 is a conceptual diagram illustrating a state of transforming the first color space composed of brightness and chromaticity into the low-chromaticity color space in which the chromaticity of the first color space has decreased.

As illustrated on the left side of the drawing, the first color space is a color space composed of an axis of brightness and two axes of chromaticities a and b. Image data in the first color space is present in an area which extends from a low-brightness area to a high-brightness area and in which two chromaticities a and b extend in an elliptical shape with the center of brightness as a peak. That is, the image data in the first color space is hardly present in a high-chromaticity area in which each of two chromaticities a and b is higher than a predetermined value.

As illustrated on the right side of the drawing, the low-chromaticity color space transform unit 102 transforms coordinates of two chromaticities a and b in the first color space into a low-chromaticity color space in which two chromaticities a and b of the first color space have decreased so as to remove a high-chromaticity area where the image data in the first color space is hardly present and each of two chromaticities a and b is higher than a predetermined value. Thus, the difference between a space of two chromaticities a and b in the low-chromaticity color space and a space of two chromaticities a and b of the image data in the first color space can be reduced so that the space of two chromaticities a and b in the low-chromaticity color space can effectively use the space of two chromaticities a and b of the image data in the first color space.

Accordingly, by transforming the first color space into the low-chromaticity color space through the use of the low-chromaticity color space transform unit 102 and applying a 3DLUT having the same number of grid points as the conventional 3DLUT defined to cover the entire area of the input color space to an area of the low-chromaticity color space, that is, an area in which the input image data is actually present, it is possible to increase the chromaticity of the image data in the first color space and to input the resultant image data to the 3DLUT, similarly to the chroma increase processing unit 16 of the image processing apparatus 10 according to the first embodiment.

In the output transform, the low-chromaticity color space inverse transform unit 104 performs image processing of transforming the transformed image data to the output image data using a 3DLUT including inverse transform processing of inversely transforming the low-chromaticity color space to the first color space and inversely transforming the image data in the inversely-transformed first color space to the input image data in the input color space.

Thus, similarly to the chroma decrease processing unit 30 of the image processing apparatus 10 according to the first embodiment, it is possible to transform the transformed image data into the output image data by decreasing the chromaticity of the transformed image data by the amount of chromaticity increased and returning the chromaticity to the chromaticity of the input image data.

As described above, in the image processing apparatus 100 according to the third embodiment, since the chromaticity of the input image data can be increased and then the resultant input image data can be input to the 3DLUT, the same effects as in the image processing apparatus 10 according to the first embodiment can be obtained.

Next, a fourth embodiment of the invention will be described below.

Figure 8:
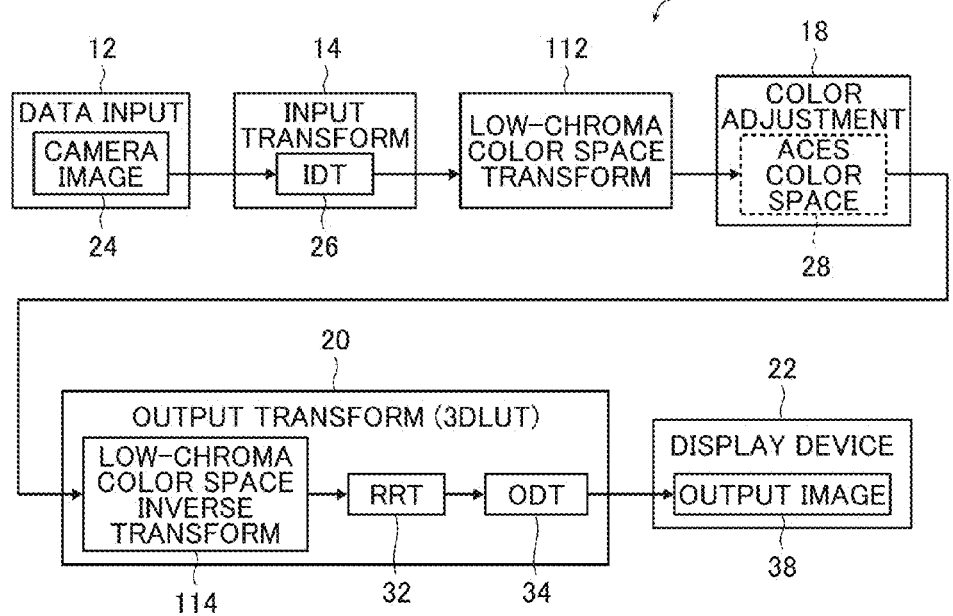
FIG. 8 is a block diagram schematically illustrating a fourth embodiment of the configuration of the image processing apparatus that performs the image processing method according to the invention.

FIG. 8 is a block diagram schematically illustrating a fourth embodiment of the configuration of the image processing apparatus that performs the image processing method according to the invention.

The image processing apparatus 110 illustrated in the drawing includes a low-chroma color space transform unit 112 and a low-chroma color space inverse transform unit 114 instead of the low-chromaticity color space transform unit 102 and the low-chromaticity color space inverse transform unit 104 in the image processing apparatus 100 according to the third embodiment illustrated in FIG. 6.

The other elements of the image processing apparatus 110 according to this embodiment are the same as in the image processing apparatus 100 according to the third embodiment and thus description thereof will not be repeated.

The low-chroma color space transform unit 112 is an example of the chroma/chromaticity optimizing unit 84 illustrated in FIG. 1. After the input transform by the input transform unit 14, the low-chroma color space transform unit 112 performs transform processing of transforming input image data in an input color space, for example, input image data in an RGB color space, into image data in a second color space composed of brightness, chromaticity, and hue, such as an L*C*H* color space and an HSL color space, and further transforming the second color space into a low-chroma color space in which the chroma of the second color space has decreased to acquire transformed image data.

Figure 9:
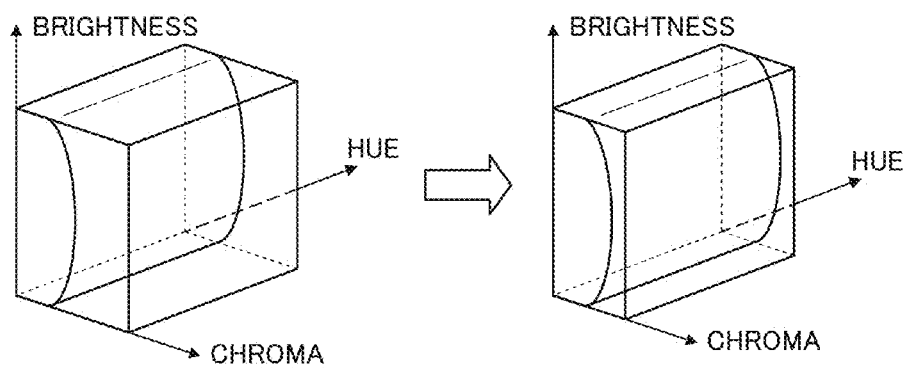
FIG. 9 is a conceptual diagram illustrating a state of transforming a second color space composed of brightness, chroma, and hue into a low-chroma color space in which the chroma of the second color space has decreased.

FIG. 9 is a conceptual diagram illustrating a state of transforming the second color space composed of brightness, chromaticity, and hue into the low-chroma color space in which the chroma of the second color space has decreased.

As illustrated on the left side of the drawing, the second color space is a color space composed of an axis of brightness, an axis of chromaticity, and an axis of hue. Image data in the second color space is present in an area which extends from a low-brightness area to a high-brightness area, which extends from a low-hue area to a high-hue area, and in which the chroma extends in an elliptical shape with the center of brightness as a peak. That is, the image data in the second color space is hardly present in a high-chroma area in which the chroma is higher than a predetermined value.

As illustrated on the right side of the drawing, the low-chroma color space transform unit 112 transforms the coordinate of the chroma of the second color space into a low-chroma color space in which the chroma of the second color space has decreased so as to remove a high-chroma area in which the image data in the second color space is hardly present and the chroma is higher than a predetermined value. Thus, the difference between both spaces of the chroma can be reduced so that the space of the chroma in the low-chroma color space can effectively use the space of the chroma of the image data in the second color space.

Accordingly, by transforming the second color space into the low-chroma color space through the use of the low-chroma color space transform unit 112 and applying a 3DLUT having the same number of grid points as the conventional 3DLUT defined to cover the entire input color space to an area of the low-chroma color space, that is, an area in which the input image data is actually present, it is possible to increase the chroma of the image data in the second color space and to input the resultant image data to the 3DLUT, similarly to the chroma increase processing unit 16 of the image processing apparatus 10 according to the first embodiment.

In the output transform, the low-chroma color space inverse transform unit 114 performs image processing of transforming the transformed image data into the output image data using a 3DLUT including inverse transform processing of inversely transforming the low-chroma color space into the second color space and inversely transforming the image data in the inversely-transformed second color space to the input image data in the input color space.

Thus, similarly to the chroma decrease processing unit 30 of the image processing apparatus 10 according to the first embodiment, it is possible to transform the transformed image data into the output image data by decreasing the chroma of the transformed image data by the amount of chroma increased and returning the chroma to the chroma of the input image data.

As described above, in the image processing apparatus 110 according to the fourth embodiment, since the chroma of the input image data can be increased and then the resultant input image data can be input to the 3DLUT, the same effects as in the image processing apparatus 10 according to the first embodiment can be obtained.

A fifth embodiment of the image processing apparatus that performs the image processing method according to the invention will be described below.

Figure 10:
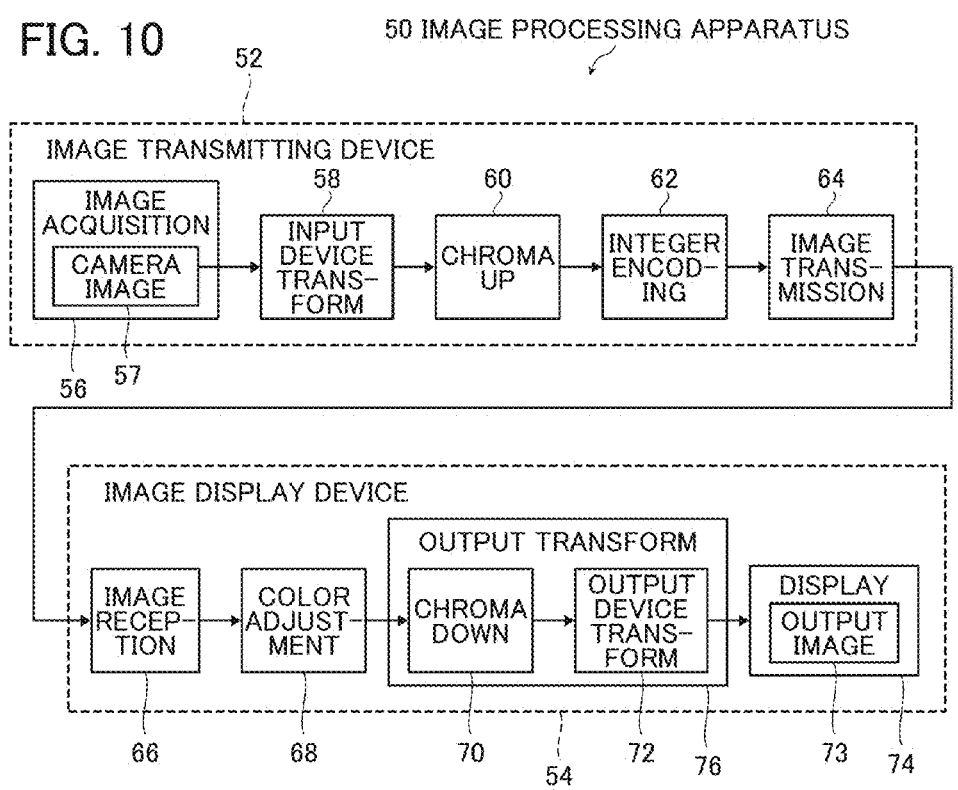
FIG. 10 is a block diagram schematically illustrating a fifth embodiment of the configuration of the image processing apparatus that performs the image processing method according to the invention.
Figure 11:
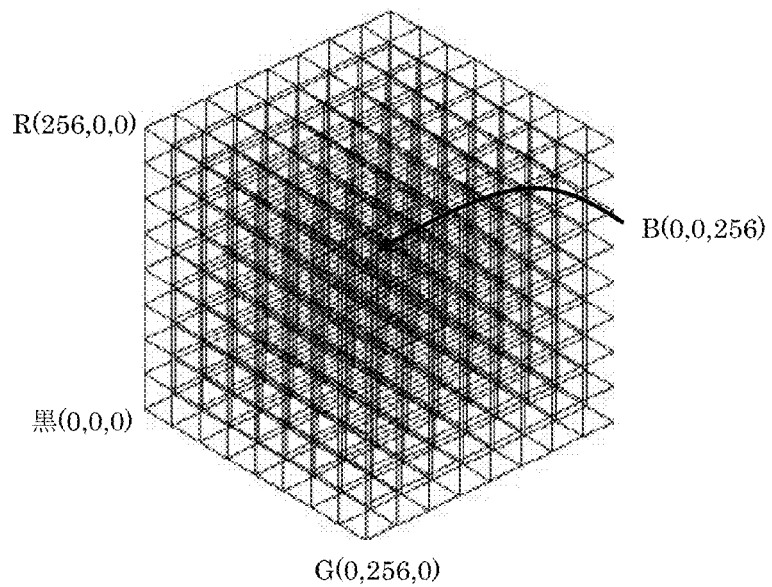
FIG. 11 is a perspective view schematically illustrating a three-dimensional lookup table as a grid-like cube.

FIG. 10 is a block diagram schematically illustrating a fifth embodiment of the configuration of the image processing apparatus that performs the image processing method according to the invention.

As illustrated in FIG. 10, the image processing apparatus 50 includes an image transmitting device 52 acquiring an image and transmitting image data thereof to an output device and an image display device 54 displaying an output image on the basis of the image data transmitted from the image transmitting device 52, and constitutes an image transmitting system.

The image transmitting device 52 includes an image acquiring unit 56 acquiring a camera image 57, an input device transform unit 58 transforming image data of the camera image 57 into image data in a common input color space, for example, an ACES color space of the AMPAS, a chroma increase processing unit 60 increasing the chroma of image data in the common input color space, an integer encoding unit 62 integer-encoding the chroma-increased image data, and an image transmitting unit 64 transmitting image data compressed through the integer encoding to the image display device 54.

The image acquiring unit 56, the input device transform unit 58, and the chroma increase processing unit 60 illustrated in FIG. 10 correspond to the data input unit (image acquiring unit) 12, the input transform unit 14, and the chroma increase processing unit 16 of the image processing apparatus 10 illustrated in FIG. 2, respectively, and detailed description thereof will not be repeated.

Before transmitting an image through the image transmitting unit 64, the integer encoding unit 62 compresses the chroma-increased image data in an area in which the high-chroma area is removed from the common input color space. The integer encoding unit 62 is not particularly limited as long as it can perform known compression encoding.

The image transmitting unit 64 transmits the chroma-increased image data in the common input color space compressed by the integer encoding unit 62 to the image display device 54. The image transmitting unit 64 is not particularly limited as long as it can transmit image data in a known image transmission manner.

The image display device 54 includes an image receiving unit 66 receiving the chroma-increased image data in the common input color space transmitted from the image transmitting device 52, a color adjusting unit 68 performing color adjustment on the chroma-increased image data in the common input color space, a chroma decrease processing unit 70 decreasing the chroma of the color-adjusted chroma-increased image data in the common input color space to return the chroma to the original chroma, an output device transform unit 72 transforming the chroma-returned image data in the common input color space into output-device-referred image data in the color space of an output device (a display unit 74), and the display unit 74 displaying an output image 73 on the basis of the output-device-referred image data. The chroma decrease processing unit 70 and the output device transform unit 72 constitutes an output transform unit 76.

In the image processing apparatus 50 according to this embodiment illustrated in FIG. 10, similarly to the image processing apparatus 10 illustrated in FIG. 2, the output transform unit 76 constituted by the chroma decrease processing unit 70 and the output device transform unit 72 preferably performs processing using a single 3DLUT.

The color adjusting unit 68, the chroma decrease processing unit 70, and the display unit 74 illustrated in FIG. 10 correspond to the color adjusting unit 18, the chroma decrease processing unit 30 of the output transform unit 20, and the display device 22 of the image processing apparatus 10 illustrated in FIG. 2, respectively, and the output device transform unit 72 illustrated in FIG. 10 corresponds to the configuration constituted by the RRT 32 and the ODT 34 of the output transform unit 20 of the image processing apparatus 10 illustrated in FIG. 2. Accordingly, the output transform unit 76 illustrated in FIG. 10 which is constituted by the chroma decrease processing unit 70 and the output device transform unit 72 corresponds to the output transform unit 20 of the image processing apparatus 10 illustrated in FIG. 2, and thus detailed description thereof will not be repeated.

The image receiving unit 66 receives compressed image data obtained by integer-encoding the chroma-increased image data in an area in which a high-chroma area of the common input color space is removed and which is transmitted from the image transmitting unit 64 of the image transmitting device 52. The image receiving unit 66 is not particularly limited as long as it is a receiving unit of a known receiving manner.

Also in the image processing apparatus 50 according to this embodiment illustrated in FIG. 10, similarly to the image processing apparatus 10 illustrated in FIG. 2, in the output transform unit 76, three processings of the chroma decrease processing by the chroma decrease processing unit 70, the transform into the output standard color space by the RRT or the like, and the output device transform by the ODT or the like are performed as single processing using a single 3DLUT, but since the input values of the 3DLUT are image data in the common input color space of which the chroma has been increased by the chroma increase processing unit 60 and the grid points can be taken in an area other than a portion having high chroma, points in the input color space and fine color densities (brightness, hue, and chroma) which are present in a scene can be reproduced in the output color space with high accuracy.

Thus, in the image processing apparatus 50 according to this embodiment, by increasing the chroma of the image data and inputting the resultant image data to the 3DLUT, it is possible to efficiently use the 3DLUT, without increasing the number of grid points of the 3DLUT. Therefore, it is possible to increase the density of the grid points in the vicinity of gray without increasing the number of grid points of the 3DLUT and thus to improve the accuracy of the color space transform of image data with a color space of a wide dynamic range using a three-dimensional lookup table.

In the invention, the process flow in the image processing apparatus illustrated in FIG. 10 can be implemented as an image processing method.

That is, at the time of performing the integer encoding on the input image data, transmitting the integer-encoded image data, and transforming the transmitted integer-encoded image data into the output image data for displaying the output image, the image processing method according to this embodiment can be implemented by performing processing of increasing the chroma before the integer encoding and performing inverse transform processing of decreasing the chroma to return the chroma as preprocessing before displaying the output image.

Accordingly, also in the image processing method according to the fifth embodiment, the same effects as in the image processing apparatus 50 according to the fifth embodiment or in the image processing method according to the first embodiment can be obtained.

In the above-mentioned image processing apparatus and the image processing method according to the fifth embodiment, the processings in the chroma decrease processing unit 70 of the output transform unit 76 and in the output device transform unit 72 including the RRT and the ODT are performed as single output transform processing using a single 3DLUT, but the invention is not limited to this. Two or more of these processings may be performed using a 3DLUT, or may be performed without using a 3DLUT, or one or two processings may be performed using a 3DLUT and the other processings may be performed without using a 3DLUT.

The application of the image processing apparatus and the image processing method according to the fifth embodiment to the video check and color adjustment system can be carried out in the same way as in the image processing method or the image processing apparatus according to the first embodiment.

The above-mentioned image processing method can be embodied in a computer by executing an image processing program.

For example, the image processing program according to the invention includes sequences causing a computer, specifically, a CPU thereof, to execute the respective steps of the image processing method. The program including these sequences may be constituted as one or more program modules.

The image processing program including the sequences that are executed by a computer may be stored in a memory (storage unit) of a computer or a server, or may be stored in a recording medium, and is read from the memory or the recording medium by the computer (CPU) or another computer and executed. Accordingly, the invention may be embodied as a computer-readable memory or recording medium having the image processing program causing a computer to execute the image processing method.

Hereinbefore, the image processing method, the image processing apparatus, the image processing program, and the computer-readable recording medium according to the invention have been described in detail, but the invention is not limited to the above-mentioned embodiments and may be improved or modified in various forms within a scope that does not depart from the gist of the invention.

What is claimed is:

1. An image processing method comprising:
performing an input transform into an input color space, the input transform being performed on input image data of an input device, wherein the input color space is independent from the input device;
after the input transform, performing transform processing of transforming i) chroma or chromaticity of the input image data or ii) chroma or chromaticity in the input color space, so as to reduce a difference i) between a space of chroma or chromaticity of the input image data and ii) a space of chroma or chromaticity in the input color space, so that the space of chroma or chromaticity of the input image data effectively uses the space of chroma or chromaticity in the input color space to acquire transformed image data; and
performing image processing of transforming the transformed image data into an output image data of an output device, by performing an output transform into an output color space of the output device, the output transform being performed on the transformed image data using a three-dimensional lookup table including inverse transform processing of returning the chroma or chromaticity of the transformed image data to the chroma or chromaticity of the input image data.

2. The image processing method according to claim 1, wherein after the input transform, transform processing of increasing the chroma of the input image data is performed to acquire transformed image data, and
in the output transform, image processing of transforming the transformed image data into the output image data is performed using a three-dimensional lookup table including inverse transform processing of decreasing an amount of chroma increased in the transformed image data to return the chroma to the chroma of the input image data.

3. The image processing method according to claim 1, wherein after the input transform, transform processing of transforming the input image data in the input color space into image data in a high-chroma color space in which chroma has increased with respect to the input color space is performed to acquire transformed image data, and
in the output transform, image processing of transforming the transformed image data into the output image data is performed using a three-dimensional lookup table including inverse transform processing of inversely transforming the transformed image data in the high-chroma color space into the input image data in the input color space.

4. The image processing method according to claim 1, wherein after the input transform, transform processing of transforming the input image data in the input color space into image data in a first color space composed of brightness and chromaticity and transforming the first color space into a low-chromaticity color space in which the chromaticity of the first color space has decreased is performed to acquire transformed image data, and
in the output transform, image processing of transforming the transformed image data into the output image data is performed using a three-dimensional lookup table including inverse transform processing of inversely transforming the low-chromaticity color space into the first color space and inversely transforming the image data in the inversely-transformed first color space into the input image data in the input color space.

5. The image processing method according to claim 1, wherein after the input transform, transform processing of transforming the input image data in the input color space into image data in a second color space composed of brightness, chroma, and hue and transforming the second color space to a low-chroma color space in which the chroma of the second color space has decreased is performed to acquire transformed image data, and
in the output transform, image processing of transforming the transformed image data into the output image data is performed using a three-dimensional lookup table including inverse transform processing of inversely transforming the low-chroma color space into the second color space and inversely transforming the image data in the inversely-transformed second color space into the input image data in the input color space.

6. An image processing method comprising:
performing an input transform into an input color space, the input transform being performed on input image data of an input device, wherein the input color space is independent from the input device;
after the input transform, performing transform processing of transforming chroma of the input image data or chroma in the input color space so as to reduce a difference between i) a space of chroma of the input image data and ii) a space of chroma in the input color space, so that the space of chroma of the input image data effectively uses the space of chroma in the input color space to acquire transformed image data; and
performing an inverse transform processing of returning the chroma of the transformed image data to the chroma of the input image data and image processing of transforming the transformed image data into an output image data of an output device by performing an output transform into an output color space of the output device, the output transform being performed on the transformed image data.

7. The image processing method according to claim 6, wherein after the input transform, transform processing of increasing the chroma of the input image data is performed to acquire transformed image data, and in the output transform, inverse transform processing of decreasing an amount of chroma increased in the transformed image data to return the chroma to the chroma of the input image data and image processing of transforming the transformed image data into the output image data are performed.

8. The image processing method according to claim 6, wherein after the input transform, transform processing of transforming the input image data in the input color space into image data in a high-chroma color space in which chroma has increased with respect to the input color space is performed to acquire transformed image data and in the output transform, inverse transform processing of inversely transforming the transformed image data in the high-chroma color space into the input image data in the input color space and image processing of transforming the inversely-transformed input image data into the output image data are performed.

9. The image processing method according to claim 6, wherein after the input transform, transform processing of transforming the input image data in the input color space into image data in a first color space composed of brightness and chromaticity and transforming the first color space into a low-chromaticity color space in which the chromaticity of the first color space has decreased is performed to acquire transformed image data and in the output transform, inverse transform processing of inversely transforming the low-chromaticity color space into the first color space and inversely transforming the image data in the inversely-transformed first color space into the input image data in the input color space and image processing of transforming the inversely-transformed input image data into the output image data are performed.

10. The image processing method according to claim 6, wherein after the input transform, transform processing of transforming the input image data in the input color space into image data in a second color space composed of brightness, chroma, and hue and transforming the second color space into a low-chroma color space in which the chroma of the second color space has decreased is performed to acquire transformed image data, and in the output transform, inverse transform processing of inversely transforming the low-chroma color space into the second color space and inversely transforming the image data in the inversely-transformed second color space into the input image data in the input color space and image processing of transforming the inversely-transformed input image data into the output image data are performed.

11. An image processing apparatus comprising:
an input transform processor which performs an input transform into an input color space, the input transform being performed on input image data of an input device, the input color space being independent from the input device;
a chroma/chromaticity optimizing processor which performs transform processing of transforming chroma or chromaticity of the input image data or ii) chroma or chromaticity in the input color space, so as to reduce a difference between i) a space of chroma or chromaticity of the input image data and ii) a space of chroma or chromaticity in the input color space, so that the space of chroma or chromaticity of the input image data effectively uses the space of chroma or chromaticity in the input color space to acquire transformed image data, after the input transform; and
an output transform processor which performs an output transform into an output color space of an output device, the output transform being performed on the transformed image data to acquire output image data of the output device,
wherein in the output transform, the output transform processor performs image processing of transforming the transformed image data into the output image data using a three-dimensional lookup table including inverse transform processing of returning the chroma or chromaticity of the transformed image data to the chroma or chromaticity of the input image data.

12. An image processing apparatus comprising:
an input transform processor which performs an input transform into an input color space, the input transform being performed on input image data of an input device, the input color space being independent from the input device;
a chroma/chromaticity optimizing processor which performs transform processing of transforming chroma or chromaticity of the input image data or ii) chroma or chromaticity in the input color space, so as to reduce a difference between i) a space of chroma or chromaticity of the input image data and ii) a space of chroma or chromaticity in the input color space, so that the space of chroma or chromaticity of the input image data effectively uses the space of chroma or chromaticity in the input color space to acquire transformed image data, after the input transform;
a color adjusting processor which performs a color adjustment on the transformed image data acquired by the chroma/chromaticity optimizing processor; and
an output transform processor which performs an output transform into an output color space of an output device, the output transform being performed on the transformed image data subjected to color adjustment by the color adjusting processor, to acquire output image data of the output device,
wherein in the output transform, the output transform processor performs an inverse transform processing of returning the chroma or chromaticity of the transformed image data subjected to color adjustment by the color adjusting processor to the chroma or chromaticity of the input image data and image processing of transforming the transformed image data subjected to color adjustment by the color adjusting processor into the output image data.

13. A non-transitory computer-readable recording medium having recorded thereon an image processing program for causing a computer to execute respective steps of the image processing method according to claim 1.

* * * * *